United States Patent [19]

Orr et al.

[11] Patent Number: 4,690,953
[45] Date of Patent: Sep. 1, 1987

[54] METHOD OF FROTHING AQUEOUS IONIC POLYURETHANE DISPERSIONS AND PRODUCTS PRODUCED THEREFROM

[75] Inventors: Robert B. Orr, Wilmington; Leon Chicosky, Jr., Newark, both of Del.

[73] Assignee: Seton Company, Newark, N.J.

[21] Appl. No.: 838,575

[22] Filed: Mar. 11, 1986

[51] Int. Cl.$^4$ .............................................. C08G 18/14
[52] U.S. Cl. ........................................ 521/65; 521/72; 521/90; 521/93; 521/156; 524/86; 524/322; 524/394; 524/399; 524/400; 524/718; 524/724
[58] Field of Search ............... 524/322, 394, 399, 400, 524/86, 718, 724; 521/65, 72-90, 93-156

[56] References Cited

U.S. PATENT DOCUMENTS

| | | | |
|---|---|---|---|
| 3,461,103 | 8/1969 | Keberle | 525/453 |
| 3,479,310 | 11/1969 | Dieterick et al. | 524/591 |
| 4,029,534 | 6/1977 | Bocks et al. | 427/412.1 |
| 4,171,391 | 10/1979 | Parker | 427/246 |
| 4,296,174 | 10/1981 | Hanzel et al. | 524/394 |
| 4,554,308 | 11/1985 | Russiello | 524/591 |

Primary Examiner—Maurice J. Welsh
Attorney, Agent, or Firm—Webb, Burden, Robinson & Webb

[57] ABSTRACT

A method of mechanically frothing and casting an aqueous ionic polyurethane dispersion to yield a mechanically frothed polyurethane foam. The method comprises admixing an aqueous ionic polyurethane dispersion with a stearate stabilizer and an optional aziridine crosslinking agent, and frothing the low viscosity admixture. The polyurethane dispersion contains particles having an average size of less than one micron, and contains between 35 and 70 percent by weight dispersed polyurethane solids. Preferably, each polyurethane particle in the aqueous dispersion is crosslinked. Before frothing, the low viscosity admixture contains between 33 and 87 percent by weight of the polyurethane dispersion, up to 33 percent by weight of an azirdine composition and between 13 and 50 percent by weight of a 33 percent aqueous dispersion of a stearate salt and has, as a result, a viscosity in the range of 100 to 200 centipoise. After frothing, the frothed admixture is knife-coated and cured into a flexible foam sheet.

31 Claims, No Drawings

METHOD OF FROTHING AQUEOUS IONIC POLYURETHANE DISPERSIONS AND PRODUCTS PRODUCED THEREFROM

FIELD OF THE INVENTION

The present invention relates to the production of polyurethane foam sheets by frothing anionic polyurethane dispersions and casting and curing the frothed dispersions into a foam sheet.

INTRODUCTION

Innumerable varied compositions of matter are grouped, without differentiation, under the broad generic appellation "polyurethane foam." Those skilled in the polyurethane foam arts are aware, however, that the polyurethane foams, and the various physical and chemical polyurethanes generally, differ markedly from each other because the sole common denominator among the varied compositions is the presence of a relatively few urethane linkages amidst a wide variety of chemical constituents and intramolecular bonds. The various polyurethane compositions and foams, as a result, manifest a wide range in the characteristics important in the foam industry, such as tensile strength, recovery, fine cell size, etc. Accordingly, different polyurethanes and polyurethane foams frequently are not interchangeable in a given application.

A number of methods are known for making flexible polyurethane foams, and specifically for making flexible foam sheets. In general, such foams have been formed from both polyurethane solvent systems and aqueous polyurethane dispersions, and have been frothed into foams both by the physical agitation of, and by the chemical generation of carbon dioxide within, the polyurethane starting material. This latter method includes, of course, the widespread preparation of polyurethane foams from the two-package polyol/polyisocyanate systems known in the art. Despite the various methods by which such flexible foam sheets have been prepared, no one method has emerged as satisfactory for use in the manufacture of all the different flexible foam compositions. Instead, specialized applications in, for example, the medical products industry, continually create a new demand for flexible polyurethane foams having increased smoothness, uniformity, tensile strength, recovery, elongation-to-break properties, and so forth.

BACKGROUND OF THE INVENTION

A number of polyurethane foams have been produced from aqueous polyurethane latices or dispersions. For example, U.S. Pat. No. 3,461,103 and U.S. Pat. No. 3,479,310, along with Great Britian Pat. No. 1,076,688, disclose churning emulsifier-free ionic polyurethane dispersions into foamed plastics. U.S. Pat. No. 3,989,869 to Neumaier et al. discloses frothing an emulsifier-free nonionic aqueous polyurethane dispersion and casting and drying the froth into a foam. The Neumaier et al. method employs polyurethane dispersions which have particles less than 1 micron in diameter, solids contents of more than 45 percent by weight and dispersion viscosities in the 200 to 1200 centipoise range, measured prior to the addition of about 0.1 to about 10 percent by weight of a thickening agent. Neumaier et al. do not disclose the viscosity of the dispersion after the addition of a thickener, but explain that the method is an improvement over their own prior method in which ionomeric polyurethane dispersions were foamed without thickener and with the addition of foaming agents, stabilizers and crosslinking compounds.

The prior method cited in Neumaier et al. is the subject matter of U.S. Pat. No. 4,029,534 to Bocks et al., which teaches the preparation of foams from certain polyurethane dispersions which have specific macroscopic properties. More particularly, the dispersions taught as suitable for use by Bocks et al. (1) must have a solids content between 45 and 62 percent by weight; (2) must have a viscosity between 200 to 1200 centipoise; (3) must have particles of a diameter between 0.05 and 1.0 micron, preferably between 0.07 and 0.30 microns; (4) must have a solubilizing ionic group present in an amount between 2 and 40 milliequivalents per 100 grams of polyurethane solids; and (5) must yield a homogeneous foil (cast without foaming) having a tensile strength of at least 40 kg/cm$^2$.

Unfortunately, the formulations and processes described in the prior art cannot always yield the necessary foam product and, more importantly, require high energy input during manufacture in order to process and shape the high viscosity starting materials. A need remains, therefore, for a flexible polyurethane foam sheet which has superior characteristics and which is further capable of manufacture from low viscosity admixtures containing dispersed polyurethane particles.

BRIEF DESCRIPTION OF THE INVENTION

In order to meet this need, the present invention is a method of mechanically frothing and casting an aqueous ionic polyurethane dispersion to yield a mechanically frothed polyurethane foam. The method comprises admixing an aqueous ionic polyurethane dispersion with a stearate stabilizer and an optional crosslinking agent, and frothing the low viscosity admixture. The polyurethane dispersion contains particles having an average size of less than one micron, and contains between 35 and 70 percent by weight dispersed polyurethane solids. Preferably, each polyurethane particle in the aqueous dispersion is crosslinked. Before frothing, the low viscosity admixture contains between 33 and 87 percent by weight of the polyurethane dispersion, up to 33 percent by weight of an aziridine composition and between 13 and 50 percent by weight of a 33 percent aqueous dispersion of a stearate salt and has, as a result, a viscosity in the range of 100 to 200 centipoise. After frothing, the frothed admixture is knife-coated and cured into a flexible foam sheet.

DETAILED DESCRIPTION OF THE INVENTION

Preparation of Aqueous Ionic Polyurethane Dispersions

The polyurethanes useful in the practice of the present invention are those recognized in the art as ionically water dispersible. These dispersions are in contrast with the emulsified isocyanate copolymers such as those disclosed in U.S. Pat. No. 2,968,575 and prepared and dispersed in water with the aid of detergents under the action of powerful shearing forces. The emulsified polyurethanes have the disadvantage that a detergent must be used to form the emulsion and such detergent is usually retained in the cured polyurethane, thus seriously detracting from the overall physical and chemical properties of the final product.

The preferred system for preparing aqueous ionic polyurethane dispersions is to prepare polymers that have free acid groups, preferably carboxylic acid groups, covalently bonded to the polymer backbone. Neutralization of these carboxyl groups with an amine, preferably a water soluble tertiary amine, affords water dilutability. Careful selection of the compound bearing the carboxylic group must be made because isocyanates, the reactive group employed most often in the generation of urethane linkages, are generally reactive with carboxylic groups. However, as disclosed in U.S. Pat. No. 3,412,054, incorporated herein by reference, 2,2-hydroxymethyl-substituted carboxylic acids can be reacted with organic polyisocyanates without significant reaction between the acid and isocyanate groups as a result of the steric hindrance of the carboxyl by the adjacent alkyl groups. This approach provides the desired carboxyl-containing polymer with the carboxylic groups being neutralized with the tertiary mono-amine to provide an internal quaternary ammonium salt and, hence, water dilutability.

Suitable carboxylic acids and, preferably, the sterically hindered carboxylic acids, are well-known and readily available. For example, they may be prepared from an aldehyde that contains at least two hydrogens in the alpha position which are reacted in the presence of a base with two equivalents of formaldehyde to form a 2,2-hydroxymethyl aldehyde. The aldehyde is then oxidized to the acid by procedures known to those skilled in the art. Such acids are represented by the structural formula:

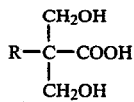

wherein R represents hydrogen, or alkyl of up to 20 carbon atoms, and preferably, up to 8 carbon atoms. A preferred acid is 2,2-di(hydroxymethyl) propionic acid.

The polymers with the pendant carboxyl groups are characterized as anionic polyurethane polymers. Further in accordance with the present invention, however, an alternate route to confer water dilutability is to use a cationic polyurethane having pendant amino groups. Such cationic polyurethanes are disclosed in U.S. Pat. No. 4,066,591, incorporated herein by reference, and particularly, in Example XVIII. In the context of the present invention, however, anionic polyurethane dispersions are preferred.

The polyurethanes useful in the practice of the invention more particularly involve the reaction of di- or polyisocyanates and compounds with multiple reactive hydrogens suitable for the preparation of polyurethanes. Such diisocyanates and reactive hydrogen compounds are more fully disclosed in U.S. Pat. No. 3,412,054 and No. 4,046,729. Further, the process to prepare such polyurethanes are well recognized as exemplified by the aforementioned patents. In accordance with the present invention, therefore, aromatic, aliphatic and cycloaliphatic diisocyanates or mixtures thereof can be used in forming the polymer. Such diisocyanates, for example, are tolylene-2,4-diisocyanate; tolylene-2,6-diisocyanate; meta-phenylene diisocyanate; biphenylene-4,4'-diisocyanate; methylene-bis-(4-phenolisocyanate); 4,4-chloro-1,3-phenylene diisocyanate; naphthylene-1,5-diisocyanate; tetramethylene-1,4-diisocyanate; hexamethylene-1,6-diisocyanate; decamethylene-1,10-diisocyanate; cyclohexylene-1,4-diisocyanate; 4,4'-methylene-bis(cyclohexyl isocyanate); tetrahydronaphthylene diisocyanate; isophorone diisocyanate and the like. Preferably, the arylene and cycloaliphatic diisocyanates are used in the practice of the invention.

Characteristically, the arylene diisocyanates encompass those in which the isocyanate group is attached to the aromatic ring. The most preferred isocyanates are the 2,4 and 2,6 isomers of tolylene diisocyanate and mixtures thereof, due to their reactivity and ready availability. The cycloaliphatic diisocyanates used most advantageously in the practice of the present invention are 4,4'-methylene-bis(cyclohexyl isocyanate) and isophorone diisocyanate.

Selection of the aromatic or aliphatic diisocyanates is predicated upon the final end use of the particular material. As is well recognized by those skilled in the art, the aromatic isocyanates may be used where the final product is not excessively exposed to ultraviolet radiation, which tends to yellow such polymeric compositions. The aliphatic diisocyanates, on the other hand, may be more advantageously used in exterior applications and may have less tendency to yellow upon exposure to ultraviolet radiation. Although these principles form a general basis for the selection of the particular isocyanate to be used, the aromatic diisocyanates may be further stabilized by well known ultraviolet stabilizers to enhance the final properties of the polyurethane product. In addition, antioxidants may be added in art recognized levels to improve the characteristics of the final dispersions. Typical antioxidants are the thioethers and phenolic antioxidants such as 4,4'-butylidine-bis-meta cresol and 2,6-ditert-butyl-para-cresol.

The isocyanate is reacted with the multiple reactive hydrogen compounds such as diols, diamines or triols. In the case of diols or triols, they are typically either polyalkylene ether or polyester polyols. A polyalkylene ether polyol is the preferred active hydrogen containing polymeric material for formulation of the polyurethane. The most usedful polyglycols have a molecular weight of 50 to 10,000 and, in the context of the present invention, the most preferred is from about 400 to about 7,000 with the higher molecular weight polyols conferring proportionately greater flexibility upon the polymer. The desired elastomeric behavior will generally require approximately 5–80 percent by weight of a long chain polyol (i.e., 700 to 2,000 eq. wt.) in the polymer.

Examples of the polyether polyols are, but not limited to, polyethylene ether glycol, polypropylene ether glycol, polytetramethylene ether glycol, polyhexamethylene ether glycol, polyoctamethylene ether glycol, polydecamethylene ether glycol, polydodecamethylene ether glycol, and mixtures thereof. Polyglycols containing several different radicals in the molecular chain, such as, for example, the compound $HO(CH_2OC_2H_4O)_nH$ wherein n is an integer greater than 1, can also be used.

The polyol may also be a hydroxy terminated or hydroxy pendant polyester which can be used instead of or in combination with the polyalkylene ether glycols. Exemplary of such polyesters are those formed by reacting acids, esters or acid halides with glycols. Suitable glycols are polymethylene glycols, such as ethylene, propylene, tetramethylene or decamethylene glycol; substituted methylene glycols such as 2,2-dimethyl-1,3-propane diol, cyclic glycols such as cyclohexane diol and aromatic glycols. Aliphatic glycols are generally preferred when flexibility is desired. These glycols are reacted with aliphatic, cycloaliphatic or aromatic dicarboxylic acids or lower alkyl esters for ester-forming derivatives to produce relatively low molecular weight polymers, preferably having a melting point of less than about 70° C. and a molecular weight comparable to those set forth above for the polyalkylene ether glycols. Acids suitable for use in preparing such polyesters are, for example, phthalic, maleic, succinic, adipic, suberic, sebacic, terephthalic and hexahydrophthalic acids and the alkyl and halogen substituted derivatives of these acids. In addition, a polycaprolactone terminated with hydroxyl groups may also be used.

When used herein, "ionic dispersing agent" means an ionizable acid or base capable of forming a salt with the solubilizing agent. These "ionic dispersing agents" are amines and preferably are water soluble amines such as triethylamine, tripropylamine, N-ethyl piperidine, and the like; also, acid and preferably water soluble acids such as acetic, propionic, lactic, and the like. Naturally, an acid or amine will be selected contingent on the solubilizing group pendent on the polymer chain.

In forming the polyurethanes useful in the practice of the invention, the polyol and a molar excess of diiocyanate are reacted to form isocyanate terminated polymer. Although suitable reaction conditions and reaction times and temperatures are variable within the context of the particular isocyanate and polyol utilized, those skilled in the art well recognize the variations. Such skilled artisans recognize that reactivity of the ingredients involved requires the balance of reaction rate with undesirable secondary reactions leading to color and molecular weight degradation. Typically, the reaction is carried out with stirring at about 50° C. to about 100° C. for about 1 to 4 hours. To provide pendant carboxyl groups, the isocyanate terminated polymer is reacted with a molar deficiency of dihydroxy acid for 1 to 4 hours at 50° C. to 120° C., to form isocyanate prepolymer. The acid is desirably added as a solution, for example, in N-methyl-1,2-pyrrolidone or N-N-dimethylformamide. The solvent for the acid will typically be no more than about 35 percent of the total charge in order to minimize the organic solvent concentration in the polyurethane composition. After the dihydroxy acid is reacted into the polymer chain, the pendant carboxyl groups are neutralized with an amine, and chain extension and dispersion are accomplished by addition to water with stirring. A water soluble diamine or polyamine may be added to the water as an additional chain extender. The chain extension involves the reaction of the remaining isocyanate groups with water to form urea groups and to polymerize further the polymeric materials, with the result that all the isocyanate groups are reacted by virtue of the addition to a large stoichiometric excess of water.

The dispersion viscosity is generally in the range of from 10 to 1000 centipoise. Useful solutions of polyurethane in organic solvents, by contrast, generally have viscosities of several thousand centipoise, ranging as high as 50,000 centipoise when the solution contains about 20 to 30 percent by weight polyurethane.

Suitable polyurethane dispersions contain, moreover, about 35 to 70 percent by weight polyurethane solids in dispersion, said solids preferably having a carboxyl content between about 35 and 70 meg per each 100 grams thereof, or at least between about 25 and 200 meq per each 100 grams. The preferred polyurethane concentration is 55 to 65 percent by weight and the most preferred concentration is 60 percent by weight polyurethane solids in dispersion.

Particle size, as a useful measure of stability, may be measured by light scattering. Useful dispersions having non-settling characteristics will generally have particles of a diameter of less than one micron. Preferably, the dispersions contain particles have a mean particle size below 850 nanometers.

One particularly useful polyurethane system is the crosslinked polyurethane system fully disclosed in U.S. Pat. No. 4,554,308 to Russiello, filed Nov. 19, 1985, entitled "Crosslinked Polyurethane Dispersions" and incorporated herein by reference. Likewise useful are the crosslinked and non-crosslinked polyurethane compositions recited in U.S. Pat. No. 4,171,391, also incorporated herein by reference.

Frothing Method

In order to froth the aqueous ionic polyurethane dispersions in accordance with the present invention, the dispersions are first admixed with a stearic acid salt and an optional aziridine crosslinking agent. The salt of stearic acid may be selected from the group consisting of aluminum stearate, ammonium stearate, calcium stearate, potassium stearate and sodium stearate. The optional aziridine crosslinking agent may be any known aziridine crosslinking agent wherein the agent has monofunctional or polyfunctional aziridine activity due to the incorporation therein of ethyleneimine, propyleneimine, butyleneimine or derivatives thereof. Preferably, the aziridine selected is the polyfunctional aziridine preparation of proprietary formula, sold under the trademark XAMA ®-7, which contains 6.35 to 6.95 meq/g aziridine content and has an aziridine functionality of approximately 3.3. The XAMA ®-7 polyfunctional aziridine has a viscosity of 1200 to 2000 centipoise at 25° C., further has a density of 1.185 g/cc at 25° C., and is completely miscible with water, acetone, methanol, chloroform and benzene.

The admixture is prepared by combining between 33 and 87 percent by weight of an aqueous ionic polyurethane dispersion, prepared as described above, with up to 33 percent by weight of XAMA ®-7 polyfunctional aziridine and between 13 and 50 percent by weight of a 33 percent aqueous or nonaqueous dispersion of the stearate salt. Different amounts and concentrations of stearate and aziridine preparations may be substituted in reactive equivalent amounts.

In theory, although Applicants do not intended to be bound thereby, the superior characteristics and easy manufacture of the subject foam is dependent upon the above disclosed ratios of polyurethane dispersion, stearate and, when present, reactive aziridine. The high polyurethane solids present in the low viscosity admixture enable preparation of a fine, smooth foam having, for example, good tensile strength and recovery characteristics, and yet the low viscosity admixture permits frothing with minimal energy input. In addition, the low viscosity of the admixture apparently contributes to the fine, even cell size in the final foam product. Furthermore, when the polyurethane dispersion incorporated into the admixture is the crosslinked polyurethane dispersion described above, the resultant foams demonstrate superior characteristics as documented in the examples below.

On a laboratory scale, the dispersion, stearate and optional aziridine may be admixed in a Hobart mixer; an Oaks or other industrial frothing mixer is suitable for full scale production. After initial admixing of the polyurethane dispersion, the stearate and the optional aziridine, in order to combine the components thoroughly, an admixture results having a viscosity between 100 and 200 centipoise. After the initial mixing, the mixture is frothed at high speed, by agitation and/or inert gas injection, for 10 to 30 minutes. The components may also be admixed and frothed via metered-delivery systems known in the art. A froth results which has very fine, uniform bubbles and which is suitable for immediate casting and curing. Although the froth may be cast by other means, the froth is particularly suited to the knife-casting technique for preparing foam sheet materials. Preferably, therefore, the liquid froth is cast upon a release surface, such as silicone coated release paper, and coated to the desired thickness with, for example, a Gardner knife. The release paper/frothed layer is then passed through an oven to dry and cure the foam. Temperatures of 90° to 100° C. are suitable for the initial drying of the foam. Temperatures above 100° C. and below about 170° C. can then be used to initiate aziridine reaction and/or thoroughly dry the foam sheet. Subsequent to complete curing and drying, the foam may be removed from the release surface and cut into desired shapes, or can be stored with or without layers of release paper in tape and/or roll form. One or both sides of the foam may be coated with an adhesive layer, as desired, or the foam may be incorporated into various laminated structures known in the art.

The invention can be further understood with reference to the following examples.

EXAMPLE I

A crosslinked polyurethane dispersion was master-batched in accordance with U.S. Pat. No. 4,554,308 to Russiello. The masterbatch contained, accordingly, individually crosslinked polyurethane particles dispersed in an aqueous phase in the concentration of 60 percent by weight polyurethane solids in aqueous dispersion. A foil formed from the crosslinked polyurethane dispersion, as prepared, demonstrated a tensile strength of 63.27 kg/cm$^2$. The dispersion contained 28 milliequivalents of solubilizing carboxyl per 100 g. of polyurethane solids, and contained particles having a means particle size of 721.7 nanometers.

One hundred parts by weight of the crosslinked polyurethane master-batch were admixed with 25 parts by weight of a 33 percent dispersion of ammonium stearate, along with 2.2 parts by weight of the polyfunctional aziridine sold under the trade name XAMA ®-7. The dispersion, the stearate and the aziridine were mixed slowly in a Hobart mixer and were then frothed, after thorough mixing, for 25 minutes.

After the 25-minute period of frothing in the Hobart mixer, the liquid froth was cast upon a silicone-surface release paper and coated to the thickness of 0.5 mm. with a Gardner knife. The release paper was transferred to a forced air oven and was dried at 100° C. for 15 minutes, followed by a final drying treatment at 137° C. for 20 minutes. The resultant foam demonstrated a density of 8 lbs/ft$^3$. Sections of the dry foam sheet were cut from the sample for the purposes of testing.

EXAMPLE II

Foam samples prepared in accordance with Example I were tested as follows. A first sample was immersed in a 3 percent soap solution for 16 hours. A second specimen was submerged in glycerine for 16 hours and a third specimen was covered with Nujol oil for 16 hours. At the end of the 16-hour period, none of the three samples showed any dimensional change either before or after removal from the test solution.

Six samples of the foam prepared in accordance with Example I where immersed in ethyl alcohol for 16 hours. Each of the specimens swelled from its original size, and the 6 samples demonstrated a swelling of 25–38 percent of their original volume.

One sample of the foam prepared in accordance with Example I was subjected to evenly applied tension and demonstrated a tensile strength of 49 lbs/in$^2$ and an elongation-to-break value of 166 percent.

Moisture vapor permeability of the foam of Example I was tested at 74° F., ambient relative humidity 50 percent, and samples of the foam demonstrated a moisture vapor transmission rate between 1363 and 1423 g/m$^2$/24 hrs.

EXAMPLE III

Seventy-eight parts by weight of the crosslinked polyurethane dispersion of Example I were admixed with 20.0 parts by weight of a 33 percent dispersion of ammonium stearate and 2.0 parts by weight of XAMA ®-7 polyfunctional aziridine. The admixture was frothed, cast and cured in accordance with Example I.

EXAMPLE IV

Seventy-nine parts by weight of an uncrosslinked aqueous ionic polyurethane dispersion were admixed with 19.5 parts by weight of a 33 percent dispersion of potassium stearate and 1.5 parts by weight of XAMA ®-7 polyfunctional aziridine. The admixture was frothed, cast and cured in accordance with Example I.

Although the invention has been described with reference to specific methods and materials, the invention is to be limited only insofar as is set forth in the accompanying claims.

We claim:

1. A frothable composition comprising an aqueous ionic polyurethane dispersion and a stearate salt.

2. The frothable composition of claim 1, wherein said dispersion contains between 35 and 70 percent by weight polyurethane solids.

3. The frothable composition of claim 1, wherein said stearate salt is a 33 percent by weight dispersion of a stearate salt.

4. The frothable composition of claim 1, wherein said stearate salt is a 33 percent by weight dispersion of a stearate selected from the group consisting of aluminum stearate, ammonium stearate, calcium stearate, potassium stearate and sodium stearate.

5. The frothable composition of claim 1, wherein said polyurethane dispersion is present in an amount between 33 and 87 percent by weight.

6. The frothable composition of claim 4, wherein said stearate salt dispersion is present in an amount between 13 and 50 percent by weight.

7. The frothable composition of claim 1, wherein said frothable composition consists essentially of an aqueous polyurethane dispersion, an aziridine composition and a stearate salt.

8. The frothable composition of claim 7, wherein said aziridine composition is present in an amount up to 33 percent by weight.

9. A method for preparing a frothed polyurethane foam, comprising:
(a) selecting an aqueous ionic polyurethane dispersion free from emulsifiers;
(b) selecting a stearate salt; and
(c) admixing, frothing, casting and curing dispersion and stearate salt.

10. The method according to claim 9, wherein step (a) further comprises the step of:
(a) selecting an aqueous ionic polyurethane dispersion, free from emulsifiers, having a polyurethane solids content between 35 and 70 percent by weight.

11. The method according to claim 9, wherein step (b) further comprises the step of:
(b) selecting a stearate salt from the group consisting of aluminum stearate, ammonium stearate, calcium stearate, potassium stearate and sodium stearate.

12. The method according to claim 9, wherein steps (b) and (c) further comprise the steps of:
(b) selecting a 33 percent by weight stearate salt dispersion containing a stearate salt selected from the group consisting of aluminum stearate, ammonium stearate, calcium stearate, potassium stearate and sodium stearate; and
(c) admixing, frothing, casting and curing said polyurethane dispersion and stearate salt dispersion.

13. The method according to claim 12, wherein step (a) further comprises the step of:
(a) selecting an aqueous ionic polyurethane dispersion, free from emulsifiers, having a polyurethane solids content between 35 and 70 percent by weight, in an amount between 33 and 87 percent by weight.

14. The method according to claim 13, wherein steps (b) and (c) further comprise the steps of:
(b) selectinga 33 percent by weight stearate salt dispersion containing a stearate salt selected from the group consisting of aluminum stearate, ammonium stearate, calcium stearate, potassium stearate and a polyfunctional aziridine crosslinking agent; and
(c) admixing, frothing, casting and curing said polyurethane dispersion, said stearate salt dispersion and said polyfunctional aziridine crosslinking agent.

15. The method according to claim 14, wherein step (b) further comprises the step of:
(b) selecting a 33 percent by weight stearate salt dispersion containing a stearate salt selected from the group consisting of aluminum stearate, ammonium stearate, calcium stearate, potassium stearate and sodium stearate, in an amount between 13 and 50 percent by weight and a polyfunctional aziridine crosslinking agent in an amount up to 33 percent by weight.

16. A frothable composition comprising an aqueous ionic crosslinked polyurethane dispersion and a stearate salt.

17. The frothable composition of claim 16, wherein said dispersion contains between 35 and 70 percent by weight crosslinked polyurethane solids.

18. The frothable composition of claim 16, wherein said stearate salt is a 33 percent by weight dispersion of a stearate salt.

19. The frothable composition of claim 16, wherein said stearate salt is a 33 percent by weight dispersion of a stearate selected from the group consisting of aluminum stearate, ammonium stearate, calcium stearate, potassium stearate and sodium stearate.

20. The frothable composition of claim 16, wherein said polyurethane dispersion is present in an amount between 33 and 87 percent by weight.

21. The frothable composition of claim 19, wherein said stearate salt dispersion is present in an amount between 13 and 50 percent by weight.

22. The frothable composition of claim 16, wherein said frothable composition consists essentially of an aqueous ionic crosslinked polyurethane dispersion, an aziridine composition and a stearate salt, wherein said aziridine composition is present in an amount up to 33 percent by weight.

23. A method for preparing a frothed polyurethane foam, comprising:
(a) selecting an aqueous ionic crosslinked polyurethane dispersion free from emulsifiers;
(b) selecting a stearate salt; and
(c) admixing, frothing, casting and curing said dispersion and stearate salt.

24. The method according to claim 23, wherein step (a) further comprises the step of:
(a) selecting an aqueous ionic crosslinked polyurethane dispersion, free from emulsifiers, having a polyurethane solids content between 35 and 70 percent by weight.

25. The method according to claim 23, wherein step (b) further comprises the step of:
(b) selecting a stearate salt from the group consisting of aluminum stearate, ammonium stearate calcium stearate, potassium stearate and sodium stearate.

26. The method according to claim 23, wherein steps (b) and (c) further comprise the steps of:
(b) selecting a 33 percent by weight stearate salt dispersion containing a stearate salt selected from the group consisting of aluminum stearate, ammonium stearate, calcium stearate, potassium stearate and sodium stearate; and
(c) admixing, frothing, casting and curing said polyurethane dispersion and stearate salt dispersion.

27. The method according to claim 26, wherein step (a) further comprises the step of:
(a) selecting an aqueous ionic crosslinked polyurethane dispersion, from from emulsifiers, having a polyurethane solids content between 35 and 70 percent by weight, in an amount between 33 and 87 percent by weight.

28. The method according to claim 27, wherein steps (b) and (c) further comprise the steps of:
(b) selecting a 33 percent by weight stearate salt dispersion containing a stearate salt selected from the group consisting of aluminum stearate, ammonium stearate, calcium stearate, potassium stearate, sodium stearate and a polyfunctional aziridine crosslinking agent; and
(c) admixing, frothing, casting and curing said polyurethane dispersion, polyfunctional aziridine crosslinking agent, and stearate salt dispersion.

29. The method according to claim 28, wherein step (b) further comprises the step of:
(b) selecting a 33 percent by weight stearate salt dispersion, containing a stearate salt selected from the group consisting of aluminum stearate, ammonium stearate, calcium stearate, potassium stearate and sodium stearate, in an amount between 19 and 20 percent by weight, and a polyfunctional aziridine crosslinking agent in an amount up to 33 percent by weight.

30. The product produced in accordance with the method of claim 9.

31. The product produced in accordance with the method of claim 23.

* * * * *

UNITED STATES PATENT AND TRADEMARK OFFICE
CERTIFICATE OF CORRECTION

PATENT NO. : 4,690,953

DATED : September 1, 1987

INVENTOR(S) : Robert B. Orr

It is certified that error appears in the above-identified patent and that said Letters Patent is hereby corrected as shown below:

Column 2 Line 34 After "optional" insert —aziridine—.

Column 3 Line 55 "process" should read —processes—.

Column 4 Line 40 "usedful" should read —useful—.

Column 5 Line 21 "pendent" should read —pendant—.

Column 5 Line 35 "4hours" should read —4 hours—.

Column 5 Line 65 "meg" should read —meq—.

Column 6 Line 7 "have" should read —having—.

Column 7 Line 45 "means" should read —mean—.

Column 7 Line 47 "master-batch" should read —masterbatch—.

UNITED STATES PATENT AND TRADEMARK OFFICE
CERTIFICATE OF CORRECTION

PATENT NO. : 4,690,953

DATED : September 1, 1987

INVENTOR(S) : Robert B. Orr

It is certified that error appears in the above-identified patent and that said Letters Patent is hereby corrected as shown below:

Claim 9 - Column 9 Line 6 After "curing" insert --said--.

Claim 14 - Column 9 Line 36 "selectinga" should read --selecting a--.

Claim 25 - Column 10 Line 27 After "stearate" (second occurrence) insert --,--.

Claim 27 - Column 10 Line 41 "from" (first occurrence) should read --free--.

Signed and Sealed this

Twelfth Day of January, 1988

Attest:

DONALD J. QUIGG

*Attesting Officer*  *Commissioner of Patents and Trademarks*